July 15, 1952      G. M. KRIEGBAUM      2,603,541
BEARING AND SEAL CONSTRUCTION
Filed Sept. 7, 1946
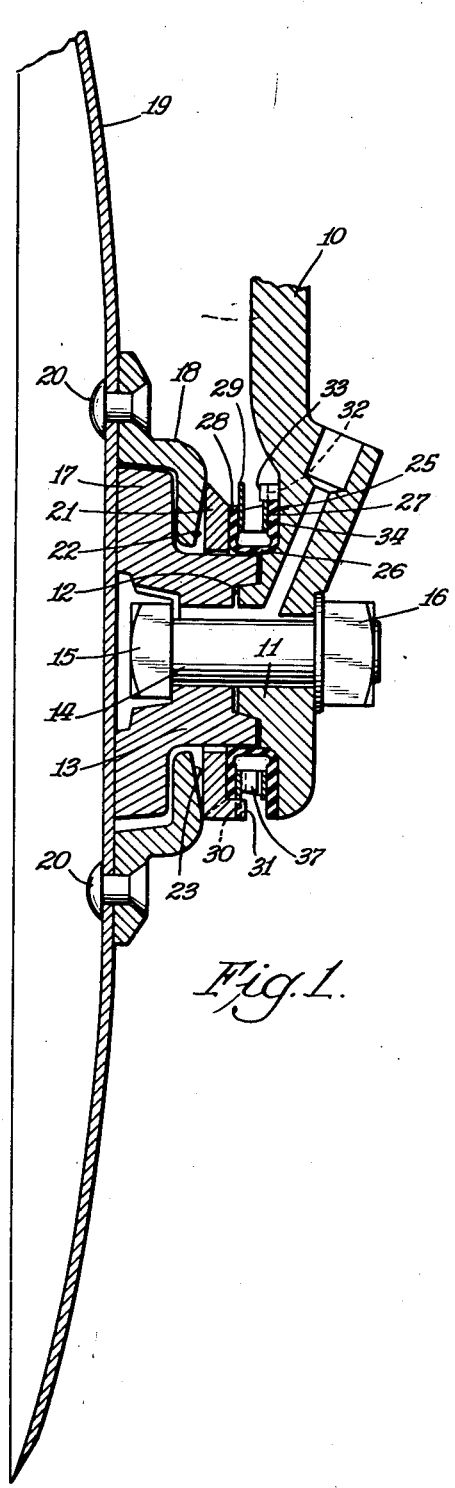
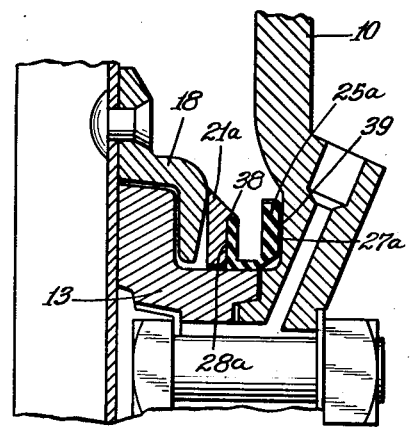
Fig. 4.
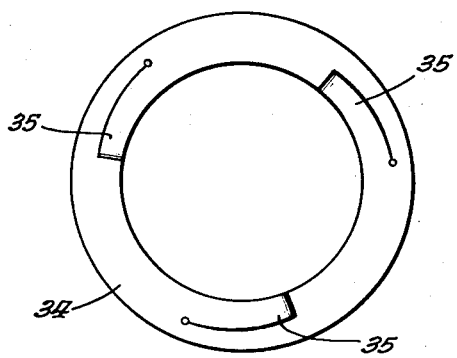
Fig. 2.
Fig. 3.
Fig. 1.
Inventor.
George M. Kriegbaum
By Paul O. Pippel
Atty Patented July 15, 1952

2,603,541

UNITED STATES PATENT OFFICE 2,603,541

BEARING AND SEAL CONSTRUCTION

George M. Kriegbaum, Richmond, Ind., assignor to International Harvester Company, a corporation of New Jersey Application September 7, 1946, Serial No. 695,361

8 Claims. (Cl. 308—36.2)

This invention relates to bearings and particularly to a bearing for the disk furrow opener of an argicultural implement.

An object of the invention is the provision of an improved bearing structure characterized by simplicity and efficiency.

Another object of the invention is the provision of an improved bearing structure for the disking tool of an agricultural implement, wherein a metal wearing ring bears against the disk structure in sliding contact therewith and is separated from the disk hanger by resilient sealing means adapted to urge the metal ring against the rotating disk structure.

Another object of the invention is to provide in a bearing a rotatable member and a metal sealing ring in engagement therewith, a stationary member and a U-shaped resilient annulus having arm portions bonded to the stationary member and the metal sealing ring.

A further object of the invention is to provide in a disk bearing a metal sealing ring in sliding engagement with a rotatable disk structure, a stationary part and a flexible U-shaped annulus having arm portions engaging the part and the ring and a spring member in the annulus urging the arms in engagement with the part and the ring.

Other objects and advantages will become clear when read in conjunction with the accompanying drawings wherein:

Figure 1 is a sectional view in elevation of a bearing embodying the features of the present invention;

Figure 2 is a plan view of part of the sealing structure;

Figure 3 is an elevation of the structure shown in Figure 2; and

Figure 4 is a modified form of sealing means for the bearing structure.

In Figure 1 the sealing structure is shown as applied to the disk bearing of an agricultural implement, and the numeral 10 designates a hanger dependent from an implement frame structure, not shown, for supporting the disk and bearing. Hanger 10 is provided with a boss 11 receivable in a recess 12 in a bearing block 13. The bearing block and the hanger 10 are secured firmly together by means of a bolt 14 having a head 15 and threaded at its end to receive a nut 16.

Block 13 is provided with a flange portion 17 receivable in the hub 18 of a disk 19 to which the hub is secured by rivets 20. The hanger 10 and bearing block 13 are thus stationary and the disk 19 and its hub portion 18 are rotatable upon the block.

Mounted upon the bearing block 13 is a metal sealing ring 21. The face of the hub portion 18 is dished as at 22, and the metal sealing ring 21 engages the hub portion near its radially outer portion providing a wedge-shaped opening 23 therebetween for holding lubricant between the hub and the metal seal.

The metal sealing or wearing ring 21 bears against the hub 18 at all times and is flexibly held thereagainst by a sealing unit comprising a flexible U-shaped annulus 25 of resilient material, such as rubber, having a base portion 26, a long arm 27, and a relatively short arm 28. The long arm 27 bears against the hanger 10 and the short arm 28 against the metal sealing ring 21. Bearing against the inner face of the arm 28 of the annulus is a metal washer 29 which is provided with a number of notches 30 about the periphery thereof, each adapted to receive a projection 31 provided on the face of the metal wearing ring 21 and projecting axially therefrom. The washer is thus held against rotation with respect to the metal sealing ring and the arm 28 of the annulus is held therebetween.

The other arm 27 of the annulus 25 is provided with a number of notches 32 to receive a corresponding number of projections 33 extending inwardly from the face of the hanger 10 to hold the annulus against relative rotation with respect thereto.

Likewise carried between the arms of the annulus 25 is a circular spring member 34 adapted to bear against the arm 27 of the annulus and to abut the radially inner face of the projections 33 on the hanger 10. The spring member 34 is provided with spring leaves 35 struck from the member 34 and terminating in bent portions 36. These spring leaves 35 bear against the washer 29 and engage projections 37 extending inwardly from the washer to prevent relative rotation of the washer and the spring member.

Thus the resilient sealing ring 25 holds the wearing ring 21 in engagement with the hub 18 of the furrow opener disk 19 at all times regardless of the forces acting upon the disks during operation thereof. This is due to the resiliency of the annulus 25 and to the circular spring member 34. It is, of course, important that the parts of the sealing unit be held against relative rotation and against rotation with respect to the hanger 10 and the sealing ring 21. This is accomplished by the interlocking of parts already described.

In the modified form of the invention shown in Figure 4 the interlocking of parts is avoided. In Figure 4 the hub 18 bears against a wearing ring 21a, which differs from the wearing ring of Figure 1 by providing a circumferential shoulder 38 which serves to abut the outer edge of a short arm 28a of a flexible annulus 25a having a longer arm 27a. The resiliency for holding the wearing ring against the disk furrow opener hub is provided in this case by the annulus alone. The arm 28a of the annulus is suitably bonded to the metal sealing ring 21a, and the arm 27a of the annulus is bonded to a part in the form of a washer 39 which bears against the hanger 10. Washer 39 is clamped between the hanger 10 and the bearing block 13 so that the washer, the annulus and the wearing ring are held against rotation upon the bearing block.

A simple and efficient seal for the bearing of a disk furrow opener has been described in which foreign matter is excluded from the bearing at all times throughout the operation of the implement, which under normal circumstances operates under very adverse conditions.

Having described the invention it should be understood that various modifications may be made therein without departing from the spirit of the invention or the scope of the appended claims.

What is claimed is:

1. A bearing structure comprising a substantially cylindrical support, a member rotatable on the support, a non-rotatable member on the support, an inflexible wearing ring on the support having sliding sealing contact with the rotatable member, a flexible U-shaped annulus having its head portion in engagement with the support and radially extending arm portions, one said arm portion having sealing contact with the inflexible ring, and the other arm engaging the non-rotatable member, and means cooperative between the arms of the annulus and the associated ring and non-rotatable member, respectively, to hold the annulus and ring against rotation.

2. A bearing structure comprising a substantially cylindrical support, a member rotatable on the support, a non-rotatable member on the support, an inflexible wearing ring on the support having sliding sealing contact with the rotatable member, a flexible U-shaped annulus having its head portion in engagement with the support and radially extending arm portions, one said arm portion having sealing contact with the inflexible ring, and the other arm engaging the non-rotatable member, means for holding the arms in engagement with the said ring and said non-rotatable member, respectively, and means cooperative between the arms of the annulus and the associated ring and non-rotatable member, respectively, to hold the annulus and ring against rotation.

3. A bearing structure comprising a substantially cylindrical support, a member rotatable on the support, a non-rotatable member on the support, a part secured to the non-rotatable member, an inflexible wearing ring on the support having sliding sealing contact with the rotatable member, and a flexible U-shaped annulus having its head portion in engagement with the support and radially extending arm portions, one said arm portion having sealing contact with the inflexible ring, and the other arm engaging said part on the non-rotatable member, said arms being bonded to the ring and to said part respectively.

4. A bearing structure comprising a substantially cylindrical support, a member rotatable on the support, a non-rotatable member on the support, an inflexible wearing ring on the support having sliding sealing contact with the rotatable member, a flexible U-shaped annulus having its head portion in engagement with the support and radially extending arm portions, one said arm portion having sealing contact with the inflexible ring, and means serving as a washer between the annulus and the non-rotatable member and engaging the other arm of said annulus, said arms being bonded to the ring and the washer, respectively.

5. A bearing structure comprising a substantially cylindrical support, a member rotatable on the support, an inflexible wearing ring on the support having sliding sealing contact with the member, a non-rotatable member on the support spaced from the ring, a flexible U-shaped annulus on the support between the ring and said non-rotatable member, said U-shaped annulus having its head portion engaging the support and radially extending arm portions engaging the ring and the non-rotatable member, resilient means surrounding the support between said arms and urging the latter in engagement with the ring and the non-rotatable member, and interlocking parts on the annulus, the ring and the non-rotatable member arranged to hold the annulus and the ring against rotation.

6. A bearing structure comprising a substantially cylindrical support, a member rotatable on the support, an inflexible wearing ring on the support having sliding sealing contact with the member, a non-rotatable member on the support spaced from the ring, a flexible U-shaped annulus on the support between the ring and said non-rotatable member, said U-shaped annulus having its head portion engaging the support and radially extending arm portions engaging the ring and the non-rotatable member, a spring member between the arm portions of the annulus arranged to urge said arms into engagement with the ring and the non-rotatable member, and interlocking parts on the annulus, the ring and the non-rotatable member arranged to hold the annulus and the ring against rotation.

7. A disk bearing for an agricultural implement comprising a hanger, a substantially cylindrical disk support carried by the hanger, a disk rotatable on the support, a substantially inflexible wearing ring on the support having sliding sealing contact with the rotatable disk, a flexible U-shaped annulus on the support between the hanger and the ring, the arm portions of said annulus engaging the hanger and the inflexible ring, spring means surrounding said annulus between the arms thereof and urging said arm portions into engagement with the hanger and the ring, and interlocking parts on the annulus, the ring and the hanger arranged to hold the annulus and the ring against rotation.

8. A disk bearing for an agricultural implement comprising a hanger, a part secured to the hanger, a substantially cylindrical disk support carried by the hanger, a disk rotatable on the support, a substantially inflexible wearing ring on the support having sliding sealing contact with the rotatable disk, and a flexible U-shaped annulus between the hanger and the ring, the arm portions of said annulus being bonded to said part on the hanger and the inflexible ring.

GEORGE M. KRIEGBAUM.

REFERENCES CITED

The following references are of record in the file of this patent:

UNITED STATES PATENTS

| Number | Name | Date |
|---|---|---|
| 866,007 | Dodson | Sept. 17, 1907 |
| 1,082,084 | Jones | Dec. 23, 1913 |
| 1,383,957 | Lewis | July 5, 1921 |
| 1,621,272 | Raymond | Mar. 15, 1927 |
| 1,860,305 | Baseman | May 24, 1932 |
| 1,931,733 | Leibing | Oct. 24, 1933 |
| 2,250,348 | Beier | July 22, 1941 |
| 2,311,287 | Boden | Feb. 16, 1943 |
| 2,408,909 | Brummer | Oct. 8, 1946 |
| 2,410,927 | Callahan et al. | Oct. 8, 1946 |